United States Patent [19]

Bose

[11] Patent Number: 4,626,397
[45] Date of Patent: Dec. 2, 1986

[54] METHOD FOR CONTROLLED ORIENTATION OF EXTRUDED RESINS

[75] Inventor: Ajit K. Bose, Lawrenceville, N.J.

[73] Assignee: Union Camp Corporation, Wayne, N.J.

[21] Appl. No.: 666,116

[22] Filed: Oct. 29, 1984

[51] Int. Cl.⁴ .............................................. B29C 55/28
[52] U.S. Cl. .................................. 264/565; 264/566; 264/569; 425/72 R; 425/326.1
[58] Field of Search ............ 264/565, 566, 569, 209.4, 264/564; 425/72 R, 326.1

[56] References Cited

U.S. PATENT DOCUMENTS

| | | | |
|---|---|---|---|
| 3,294,882 | 12/1966 | Lutzmann et al. | 264/569 |
| 3,754,067 | 8/1973 | St. Eve et al. | 264/569 |
| 4,115,048 | 9/1978 | Alderfer et al. | 264/565 |
| 4,204,819 | 5/1980 | Ushioda et al. | 264/565 |
| 4,472,343 | 9/1984 | Kawamura et al. | 264/565 |
| 4,479,766 | 10/1984 | Planeta | 264/569 |
| 4,511,530 | 4/1985 | Olsson et al. | 264/564 |

FOREIGN PATENT DOCUMENTS

| | | | |
|---|---|---|---|
| 0922063 | 3/1973 | Canada | 264/569 |
| 0005340 | 2/1978 | Japan | 264/564 |
| 53-52570 | 5/1978 | Japan | 264/564 |
| 0154126 | 12/1980 | Japan | 264/564 |
| 0059069 | 4/1983 | Japan | 425/72 R |
| 58-101018 | 6/1983 | Japan | 264/564 |
| 0119823 | 7/1983 | Japan | 264/569 |
| 0179621 | 10/1983 | Japan | 264/569 |
| 0219021 | 12/1983 | Japan | 264/569 |
| 59-14928 | 1/1984 | Japan | 264/569 |
| 0011219 | 1/1984 | Japan | 425/404 |
| 0042931 | 3/1984 | Japan | 264/565 |
| 0136224 | 8/1984 | Japan | 264/569 |
| 0171620 | 9/1984 | Japan | 264/569 |

Primary Examiner—Jeffery Thurlow
Attorney, Agent, or Firm—Kane, Dalsimer, Kane, Sullivan and Kurucz

[57] ABSTRACT

A process for extruding biaxially oriented high density polyethylene film in which an additional secondary gaseous cooling medium is applied at strategic strain inducing locations of the blown bubble to control the final product properties of the extruded material.

7 Claims, 3 Drawing Figures

METHOD FOR CONTROLLED ORIENTATION OF EXTRUDED RESINS

BACKGROUND OF THE INVENTION

1. Field of the Invention

The invention relates to the extrusion of resinous thermoplastic materials, and more particularly to the method for extruding biaxially oriented high density polyethylene film in which an additional secondary gaseous cooling medium is applied at strategic strain inducing locations of the blown bubble to control the final product properties of the extruded material and to the product produced by such method.

2. Brief Description of the Prior Art

It is well known to use primary air against a blown bubble of plastic to aid in the expansion of the bubble and the formation of such bubble into the desired shape.

In the normal high or medium molecular weight straight chain resin extrusion to ensure adequate orientation, small die sizes (3½", 4", 6", 8") are used with one cooling air (primary) placed at the die top to cool the outgoing melt. Melt is drawn at about 1:1 blow-up-ratio (B.U.R.) to about 6 times the die diameter in height to give machine direction (MD) orientation and then blown in transverse direction to required lay flat width 3.2 to 3.5 B.U.R. to give adequate transverse direction (TD) orientation. It is well known when properties of these films, i.e., from 3.5" to 8" die sizes are tabulated they follow a descending order. In other words, total orientation MD/TD from a 3½" or 4" die is far superior to an 8" die. Following is an example of resin having a 0.954 density and 0.06 melt index film properties from a 4" and a 6" die using a normal blown process, i.e., one primary air cooling at die top, no internal drag.

| Die Size | 4" | 6" |
|---|---|---|
| Long Flat | 20" tubes | 40" (2 up 20" tubes) |
| Gauge mils | 0.7 | 0.7 |
| B.U.R. | 3.2 | 4.2 |
| Yield tensile psi | | |
| MD | 5300 | 4300 |
| TD | 5500 | 3600 |
| MD/TD | (0.96) | (1.19) |
| Ultimate tensile psi | | |
| MD | 8900 | 5900 |
| TD | 8200 | 3800 |
| MD/TD | (1.08) | (1.55) |
| Elongation % | | |
| MD | 476 | 395 |
| TD | 354 | 540 |
| MD/TD | (1.34) | (0.73) |
| Tear gms/mil | | |
| MD | 33 | 16 |
| TD | 158 | 397 |
| MD/TD | (0.2) | (.04) |
| TD/MD | 5 | 25 |
| Impact gms/mil | 280 | 68.5 |
| Output | 150 lbs/hr. | 220 lbs/hr. |
| Neck height inches | 24" | 38" |

Like any other industry, for a good return on investment, i.e. high output, multiple bags must be produced in-line. Present technology does not enable us to achieve this with good or optimum product properties using a larger die size. Present technology uses small dies that give small lay flat widths (1 up) and at a lower output. On the other hand, the latest bag machines are designed to run 3 up bags. Hence matching of extruder to bag machine now becomes a problem.

The use of a secondary cooling source for a low density polymer extrusion to upgrade optical properties (haze and gloss) or to increase output is disclosed in the following patents:

Canadian Pat. No. 922,063—Mar. 6, 1973—St. Eve and Bose

U.S. Pat. No. 3,754,067—Aug. 21, 1973—St. Eve and Bose

Secondary cooling to give more rigidity so that a longitudinal continuous slitting can be done (sheeting out of a tube) is disclosed in U.S. Pat. No. 4,115,048, Sept. 19, 1978, Alderfer.

The present invention differs drastically in approach from such prior art.

The method of the present invention employs secondary cooled air from a ring which can be moved upward and downward along the vertical axis of the bubble to direct air at the point where transverse direction orientation forces take over. This differentiates it from Canadian Pat. No. 922,063. The cooling air is delivered from a straight nozzle or without a nozzle, without a chimney, thus having normal air with a venturi effect on the bubble. It has been found that such secondary cooled air to control the strain rate permits control of the final film properties, e.g. tear, impact and balancing of tensile, elongation, etc. The optimization of product properties in this manner is not found in the prior art for the conventional extrusion of resinous thermoplastic materials.

SUMMARY OF THE INVENTION

The invention covers the extrusion-blowing of a biaxially oriented, high density polyethylene tubular article which comprises passing plasticized polyethylene from the die of an extruder wherein said polyethylene is shaped in the form of a hollow tube, continuously passing the tube through an air quench from a primary air zone to induce machine direction (MD) orientation in the polymer melt, drawing the tube at an increased speed through a secondary adjustable air zone sufficient to partially cool the melt at the flex point where transverse direction (TD) orientation takes over and freezes into the melt, so that the ratio of machine direction properties to transverse machine properties can be varied. A conical shaped stabilizer may be positioned at the end of the machine direction orientation to add additional strain to the tube.

The invention also covers the biaxially oriented high density polyethylene film produced by this process with desired properties for the particular uses of the film.

DETAILED DESCRIPTION OF THE PREFERRED EMBODIMENT

The invention herein deals primarily with biaxially oriented film using straight chain structured polymer having a density of 0.94 or higher gms/cc or a blend of the same type polymers of varying densities. This straight chain structured resin, containing higher alpha olefins (HDPE) due to their composition, contains higher crystalline ratios than normal low density thermoplastic resins. This contributes toward high modulus of these films. From material science the rate of deformation of the material from molten state to solid stage controls the orientation of the molecular structure in the partially frozen material to induce maximum possible strain and improves product properties of the final film. In higher density material, controlling orientation in MD and TD of the melt pool becomes of utmost importance.

In forming products from these higher density films the aim is to obtain machine and transverse direction strength properties (ultimate tensile, yield tensile, secant modulus) with a ratio of approximately 1:1. For example given an average ultimate tensile between 6000-8000 psi, tensile yield of 3500-5500 psi, secant modulus of 70,000-150,000 psi, impact of the film will be between 100-200 gms/mil. Tear properties of higher density polymer have a higher transverse strength compared to machine direction strength, this property can now be controlled between 1 to 10 at TD/MD or at 0.1 to 1.25 if we consider MD/TD ratios.

Furthermore, the present invention is effective to run bigger die sizes with a good output utilizing one extruder to give multiple webs when slit-sealed to the bag machine. The key to the new innovation is using additional gaseous cooling medium at strategic strain inducing locations (a) with and (b) without an internal shaper or former at the exit of MD strain area to create additional drag over the TD strain inducing area.

Figure 1:
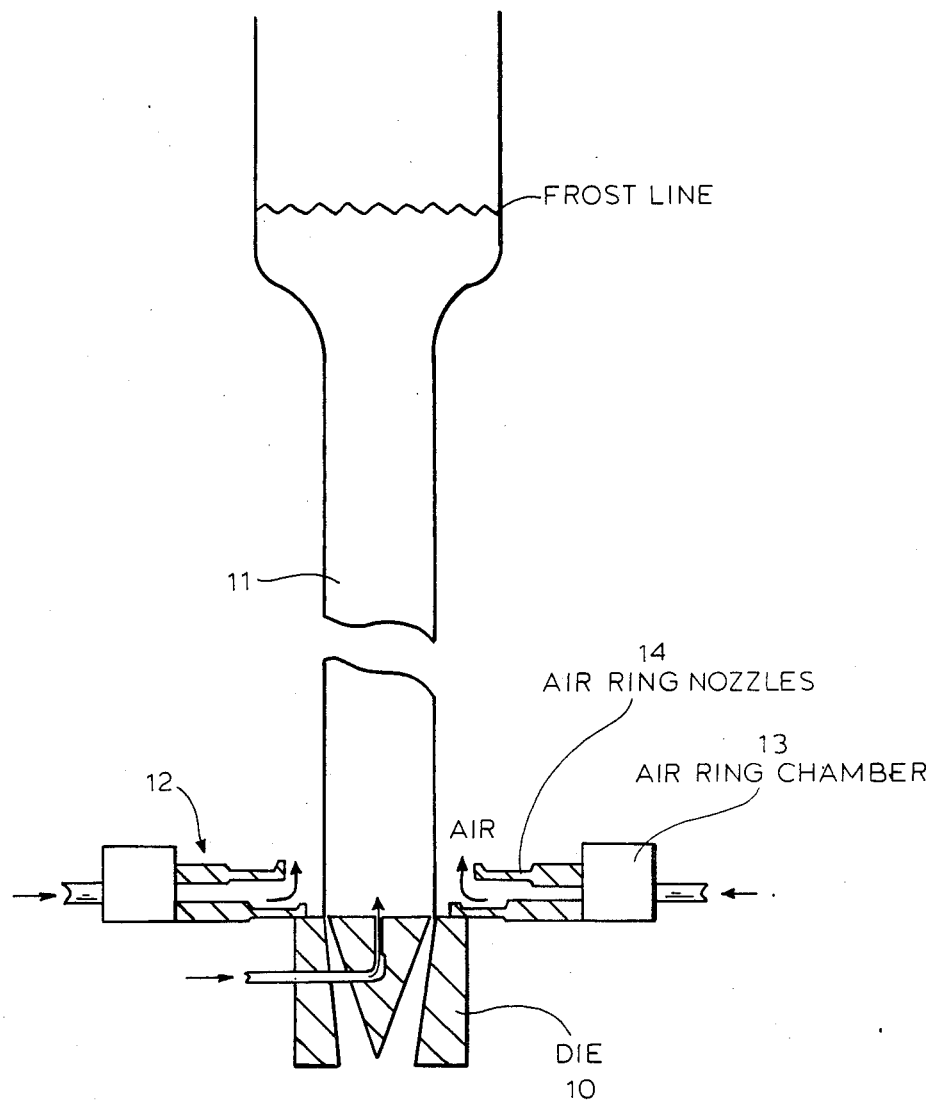
FIG. 1 is a diagrammatic side elevation of a blown film coming from the die of an extruder showing a primary air ring with nozzles.

Referring to the drawings, there is shown in FIG. 1 the melt being extruded from the die 10 of an extruder at a die temperature of approximately 380°–480° F. into a tubular film which starts as a stalk 11 which is cooled by a primary air ring 12 positioned at the die 10. This primary air ring is provided with a chamber 13 and air nozzles 14 which blow cool air upwardly along the stalk. The air supply to this air ring is just enough to hold the bubble. The stalk conforms generally in diameter to the diameter of the die and extends upward in terms of the die diameter typically 5 to 8 diameters of the die depending on the nature of the resins, ambient temperatures and line speed. For example if the die is 6" in diameter the stalk height could be approximately 8 times that diameter or 48". FIG. 1 shows the view for a conventional process.

Figure 2:
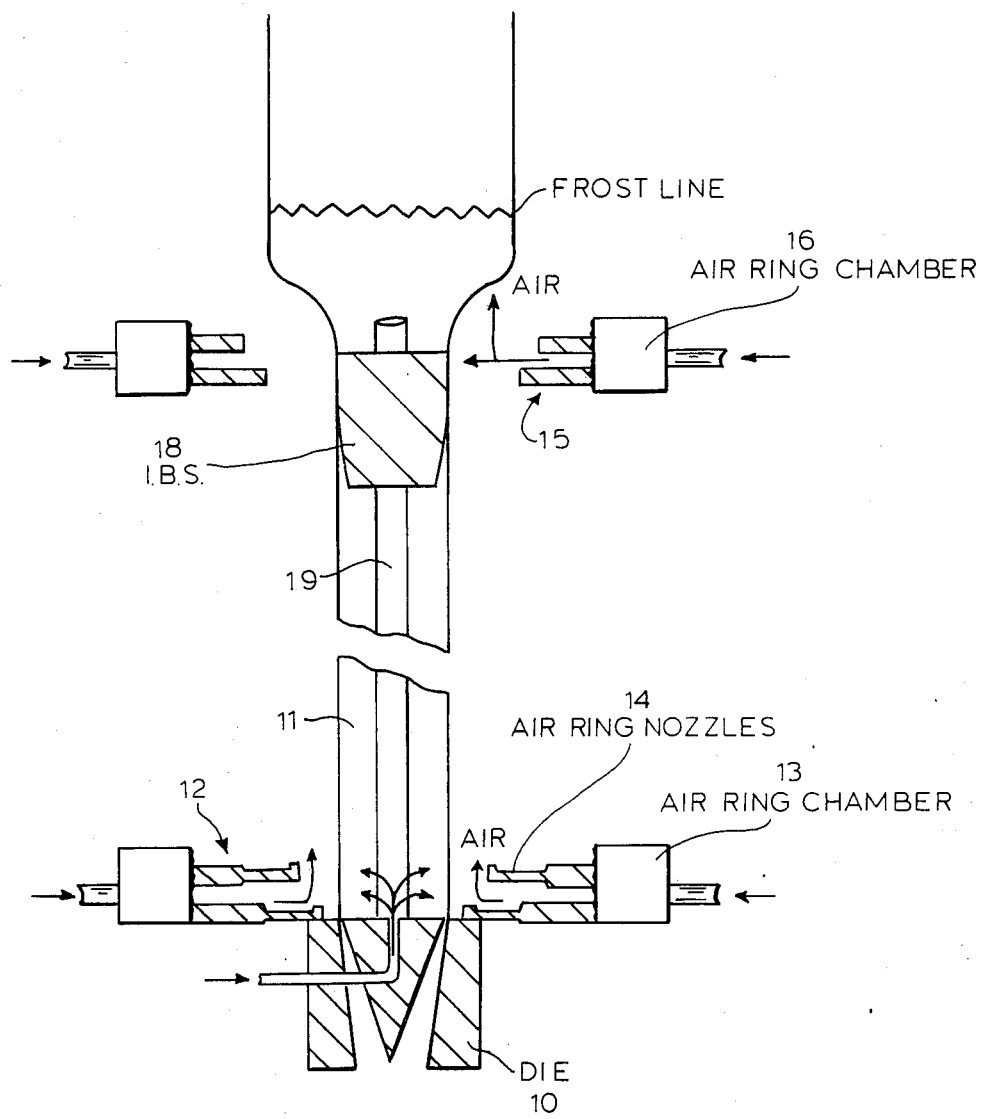
FIG. 2 is a view similar to that of FIG. 1 showing a primary air ring with nozzles, an internal bubble stabilizer, and a secondary cooling chamber positioned to direct cool air along the point where transverse orientation takes over to orient the film to provide certain desired properties.
Figure 3:
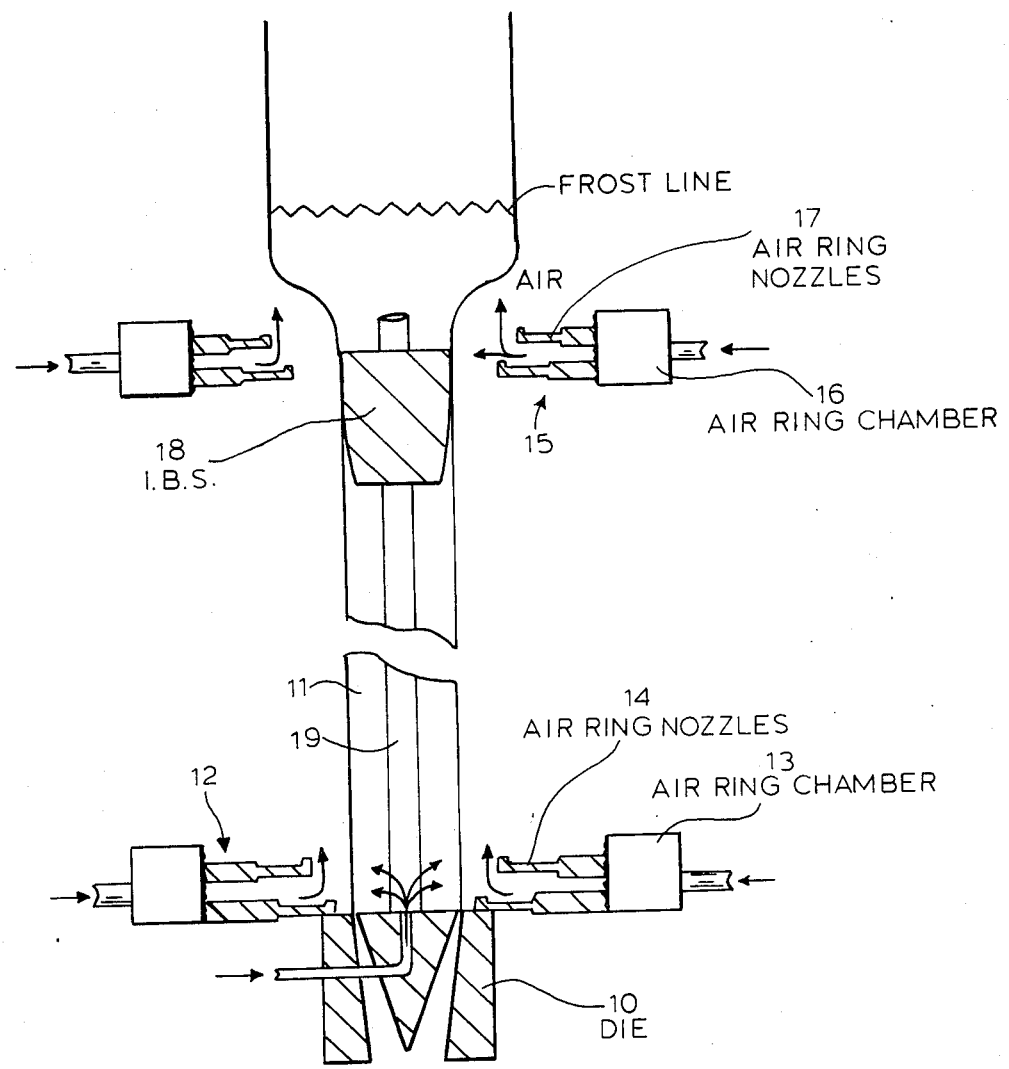
FIG. 3 is a view similar to that of FIG. 2 showing the same elements with the secondary air ring provided with nozzles.

FIGS. 2 and 3 show the views for the process of the present invention with the layout of FIG. 2 employing a secondary air ring 15 provided with a chamber 16 and the layout of FIG. 3 employing the secondary air ring 15 with the chamber 16 and nozzles 17. Utilization of a secondary gaseous cooling at a certain velocity (800-1000 cfm) at 60° F. is introduced through a ½" wide aperture in the air ring in conjunction with an internal bubble stabilizer (IBS) 18 or surface inducing drag placed at the end of the machine direction orientation control to ensure proper deformation rate dt/dθ (t=thickness; θ=time), where crystallite and amorphous areas undergo induced strain and get frozen in the amorphous areas. Resulting film thus shows better tensile, yield and modulus balance, enables a control over tear and gives superior impact properties. The shrink force around the drag surface, the internal force from entrapped air to get right lay flat in transverse direction and the nip speed or draw velocity of the film, creates the necessary strain on the highly knitted molecular lattice work polymers of high densities. The orientation becomes more effective as the molten mass is still in slightly cooled fluid state but above the crystallization set point. The ensuring strain faces the oncoming gaseous cooling medium and gets frozen.

Depending on the molecular weight, molecular weight distribution of a higher density resin, the positioning of the secondary cooling media to give optimum properties may vary as follows:

| Density | Melt Index | Resin | Height of Secondary Cooling |
|---|---|---|---|
| 0.954 | 0.06 | | 1" to 3" + (6" to 8"8 × die diameter in inches) |
| 0.953 | 0.05 | | 2" to 3" + (6" × die diameter in inches) |
| 0.953 | 0.10 | | 2" to 3" + (6" × die diameter in inches) |
| 0.953 | 0.10 | Arco 6000 FB 520 | 2" to 3" + (6" × die diameter in inches |

Polymer melt emerging through a die gap (0.045") at 420° F. undergoes die-swelling approximately 5-15% depending on resin used. Molten poly is now drawn at draw velocity approximately ⅓ to ½ of the line speed at about 1:1 B.U.R. over the internal shaper or bubble stabilizer 18 which is connected to the top of the die via a hollow shaft 19. The hollow shaft with side holes enables an open internal area between the top and bottom of the bubble. At startup, a plug is placed on top to blow the bubble and wrap it over the shaper. At this point the plug is taken off which allows the addition of air to get required lay flat width. The 0.045" polymelt form die top gets drawn out to 0.006"-0.008" at the end of the shaper and gets partially cooled and slight shrinkage takes place. (The diameter of the shaper is 1:1 to die size). The shrinkage of the poly tube now creates additional drag on the internal polyface of the bubble at this point, transverse blowing occurs until required size of the product has been achieved. The temperature of the polymelt could be anywhere from 280°-320° F. depending on the die output. The primary air ring and progressive thinning out of the tube wall thickness has occurred in a molten state giving MD strain. At this point the internal drag of the line velocity along with internal air pressure takes over (3.2-4.5 B.U.R.) as the diameter increases from 1:1 B.U.R. to required B.U.R. here thinning of the tube from 0.005-0.008" to 0.007" or required gauge occurs. This critical area where TD strain is created undergoes additional cooling to freeze the resulting orientation. A perfect MD/TD balance will give bi-axial films.

It was also proven that using a narrow cooling aperture, i.e. concentrated cooling at one area, gave better orientation for the film for making bottom seal bags. The trial with a cooling shroud, i.e. no nozzle aperture but a wide slot further away from the film surface, gave almost bi-axial properties in strength and tear. From the test results it will be apparent that there are the following alternatives with regard to the application of the secondary air cooling:

A. Low Volume-High Velocity

Using nozzles for a concentrated cooling medium at a closer surface with velocity of 800–1000 cfm created better and fast quench on the transverse orientation area. The heat transfer ratio $h_c$ is dependent to Reynolds number which is governed by the velocity of the cooling fluid.

B. High Volume-Low Velocity

Using an air chamber (absent nozzles) further away from the film with high volume and very low diffusion (2500–3000 cfm) did not give higher heat transfer on orientation sites. (Lower constant velocity hence, lower $h_c$ heat transfer coefficient). Following are the film properties with a secondary air ring with nozzles, a secondary air ring with no nozzles, and with only a normal primary air ring:

| Run & Group No. | 11/30/83 A (3) | 12/1/83 B (2) | Normal Set Up |
|---|---|---|---|
| Top air ring | With nozzles 48″ from Die | No nozzles 42″ from Die | Bottom air Refrigerated no Top air |
| Stalk height | 49″ | 40″ | 38″ |
| IBS | Yes | Yes | No |
| Gauge-mils | 0.8 | 0.68 | 0.7 |
| Line Speed-fpm | 166 | 141 | 165 |
| Ult. Tensile psi | | | |
| MD | 7800 | 9600 | 4300 |
| TD | 3950 | 4800 | 3800 |
| (MD/TD) | (1.15) | (1.07) | (1.55) |
| Elongation % | | | |
| MD | 425 | 515 | 395 |
| TD | 500 | 575 | 540 |
| (MD/TD) | (0.9) | (0.9) | (0.73) |
| 1% Secant Mod psi | | | |
| MD | 125,000 | 123,000 | 55,000 |
| TD | 150,000 | 127,000 | 81,000 |
| (MD/TD) | (0.18) | (0.16) | (0.04) |
| Imp | 191 | 196 | 68.5 |
| gm/mil | | | |

The primary air ring has approximately the same diameter as the die. Although a secondary air ring with the same diameter as the primary air ring will operate, it has been found that improved results are attained if the secondary air ring is 1.3 to 1.6 times the diameter of the primary air ring (in round numbers).

The secondary air ring 15 encircling the bubble may be provided with suitable apparatus to permit this air ring to travel along the bubble vertical axis from the primary air ring to the top of the stalk depending on the resin used and the line output. This air ring can merely introduce low pressure, high volume air, not at high velocity against the bubble. If this air ring is supplied with air nozzles it will create high velocity air and have very effective cooling in the area where it impinges. While the primary air ring is used to blow normal air (70°–90° F.) against the bubble, the secondary air (40°–50° F.) is used to blow refrigerated plant air from the nozzles. This secondary air can be used over the stalk height up to the base of the tulip (transverse orientation, blow up area).

It has been found that by changing the position of the secondary air ring (with or without nozzle inserts) along the hollow tube and directing cooled air at predetermined areas of the tube the melt will be partially cooled at the flex point where transverse direction or orientation takes over and freezes the melt. This serves to change the ratio of MD properties to TD properties, as is shown by the following trial data and product properties for different runs under different conditions. The air ring with nozzles provides a more uniform strain rate along the TD area and may be preferable to the air ring without nozzles.

TRIAL DATA AND PRODUCT PROPERTIES CONTROLLED ORIENTATION

| RUN & GROUP # | 11/30/83 #2 | 11/29/83 #2 | 12/8/83 #1 | 11/30/83 #3 | 12/1/83 #2 | NORMAL SET UP |
|---|---|---|---|---|---|---|
| Top air ring | with nozzles | with nozzles | with nozzles | with nozzles | no nozzles | Bottom air-no nozzles Refrigerated |
| at | 33″ from Die | 49″ from Die | 34″ from Die | 48″ from Die | 42″ from Die | no Top air |
| Stalk height | 45″ | 53″ | 42″ | 49″ | 40″ | 38″ |
| IBS | no | no | yes | yes | yes | no |
| Gauge-mils | 0.77 | 0.76 | 0.7 | 0.8 | 0.68 | 0.7 |
| Line speed-fpm | 145 | 137 | 141 | 166 | 141 | 163 |
| Ult. tens psi | | | | | | |
| MD | 6700 | 7300 | 9800 | 7800 | 9600 | 4300 |
| TD | 6850 | 7000 | 6900 | 6700 | 7200 | 3600 |
| (MD/TD) | (0.98) | (1.04) | (1.42) | (1.16) | (1.33) | (1.19) |
| Yield tens. psi | | | | | | |
| MD | 4100 | 4700 | 5250 | 4550 | 5150 | 5900 |
| TD | 3820 | 4200 | 4800 | 3950 | 4800 | 3800 |
| (MD/TD) | (1.07) | (1.12) | (1.09) | (1.15) | (1.07) | (1.55) |
| Elong % | | | | | | |
| MD | 470 | 580 | 500 | 425 | 515 | 395 |
| TD | 440 | 535 | 605 | 500 | 575 | 540 |
| (MD/TD) | (1.06) | (1.08) | (0.83) | (0.9) | (0.9) | (0.73) |
| Sec Mod psi | | | | | | |
| MD | 119,350 | 128,200 | 127,000 | 125,000 | 123,000 | 55,000 |
| TD | 126,000 | 127,800 | 157,000 | 150,000 | 127,000 | 81,000 |
| (MD/TD) | (0.95) | (1.00) | (0.81) | (0.83) | (0.97) | (.68) |
| Elm Tear gm/mil | | | | | | |
| MD | 29 | 32 | 16 | 21 | 18 | 16 |
| TD | 35 | 49 | 150 | 116 | 110 | 397 |
| (MD/TD) | (0.83) | (0.67) | (0.1) | (0.18) | (0.16) | (0.04) |
| Imp | | | | | | |

| -continued | | | | | | |
|---|---|---|---|---|---|---|
| TRIAL DATA AND PRODUCT PROPERTIES CONTROLLED ORIENTATION | | | | | | |
| RUN & GROUP # | 11/30/83 #2 | 11/29/83 #2 | 12/8/83 #1 | 11/30/83 #3 | 12/1/83 #2 | NORMAL SET UP |
| gm/mil | 154 | 144 | 153 | 191 | 196 | 68.5 |

Equipment used 6" Egan spiral 24/1 $\frac{L}{D}$
Bottom air ring 6" using plant air
Top air ring 10" using refrigerated air
Resin Arco 6000

Those skilled in the art will appreciate that many variations of the above described embodiment may be made without departing from the spirit and scope of the inventor.

What is claimed is:

1. A process for the extrusion-blowing of a biaxially oriented, high density polyethylene tubular article, which comprises;

providing apparatus for thermally plasticizing and shaping said polyethylene, which comprises an extruder having a feed zone, heating zones, shaping zones and means for passing the polyethylene in successive stages through each of said zones, said zones being interconnected;

feeding the polyethylene to said feed zone;

continuously passing the fed polyethylene to the heat zones, said heat zones being maintained at a temperature above the first order phase transition temperature of the fed polyethylene, whereby said fed polyethylene is thermally plasticized;

continuously passing plasticized polyethylene to a shaping zone wherein said polyethylene is shaped in the form of a hollow tube;

continuously passing the hollow tube through an air quench, in the form of a primary air zone, inducing machine direction orientation in the tube of plasticized polyethylene;

drawing the air quenched tube over a bubble stabilizer to add strain to the tube;

drawing the formed and air quenched hollow tube at an increased speed though a secondary adjustable air zone;

cooling the drawn tube in the secondary adjustable air zone by directing a flow of chilled air on the tube, said adjustable air zone being positioned along the drawn tube at the flex point where transverse direction orientation takes over and freezes into the drawn tube, whereby the ratio of machine direction properties to cross direction properties in the fully shaped hollow tube can be varied; and blowing the cooled and drawn tube.

2. A process for extruding a biaxially oriented, high density polyethylene tubular article, which comprises;

continuously passing thermally plasticized polyethylene from the die of an extruder wherein said polyethylene is shaped in the form of a hollow tube;

continuously passing the hollow tube through an air quench, in the form of a primary air zone employing ambient air and thus inducing machine direction orientation in the polymer melt;

drawing the air quenched tube over a conical shaped stabilizer at the end of the machine direction orientation to add additional strain to the tube;

drawing the formed and air quenched hollow tube at an increased speed through a secondary adjustable air zone; directing on the tube chilled air sufficient to partially cool the tube at the flex point where transverse direction orientation takes over and freezes into the tube in the secondary adjustable air zone whereby the ratio of machine direction properties to cross direction properties in the tube can be changed; and blowing the tube.

3. The process of claim 2 in which the chilled air from the secondary air zone is fed through nozzles at between 800 and 1500 cfm which nozzles are positioned to direct the concentrated chilled air against the exterior of the tube in the area between the flex point where transverse direction orientation takes over and the fully shaped hollow tube.

4. The process of claim 2 in which the chilled air from the secondary air zone is at between 2500 and 3000 cfm from an air ring positioned to direct unconcentrated chilled air against the exterior of the tube in the area between the flex point where transverse direction orientation takes over and the fully shaped hollow tube.

5. The process of claim 2 in which the chilled air rate from the secondary air zone is fed through nozzles at between 800 and 1500 cfm which nozzles are positioned to direct the concentrated chilled air against the exterior of the tube in the area between the flex point where transverse direction orientation takes over and the fully shaped hollow tube.

6. The process of claim 2 in which the chilled air from the secondary air zone is at between 2500 and 3000 cfm from an air ring positioned to direct unconcentrated chilled air against the exterior of the tube in the area between the flex point where transverse direction orientation takes over and the fully shaped hollow tube.

7. The process of claim 2 in which the primary air zone is an air ring with approximately the same diameter as the die and the secondary air zone is an air ring with a diameter approximately 1.3 to 1.6 times the diameter of the primary air ring (in round numbers).

* * * * *